May 18, 1965  E. K. LETZER  3,184,307

METHOD AND APPARATUS FOR MAKING COLOR PRINTS

Filed Aug. 14, 1959  2 Sheets-Sheet 1

Edward K. Letzer
INVENTOR.

BY
ATTORNEYS

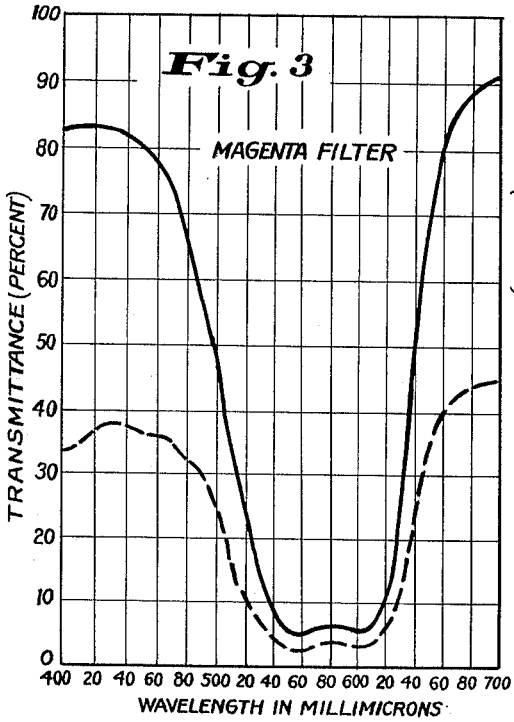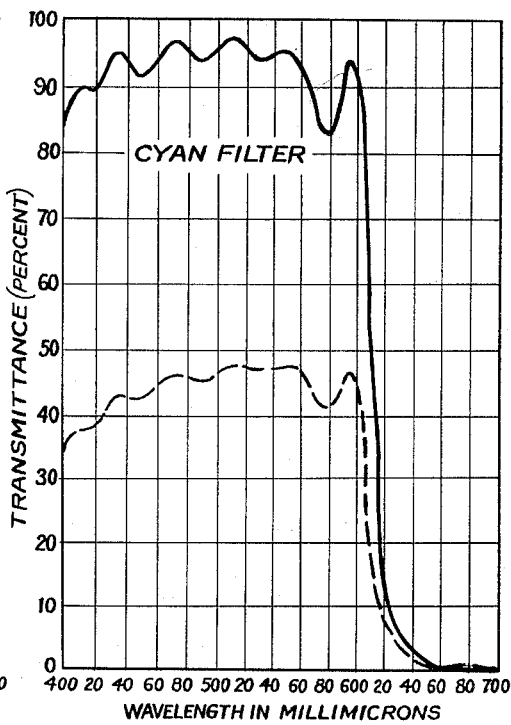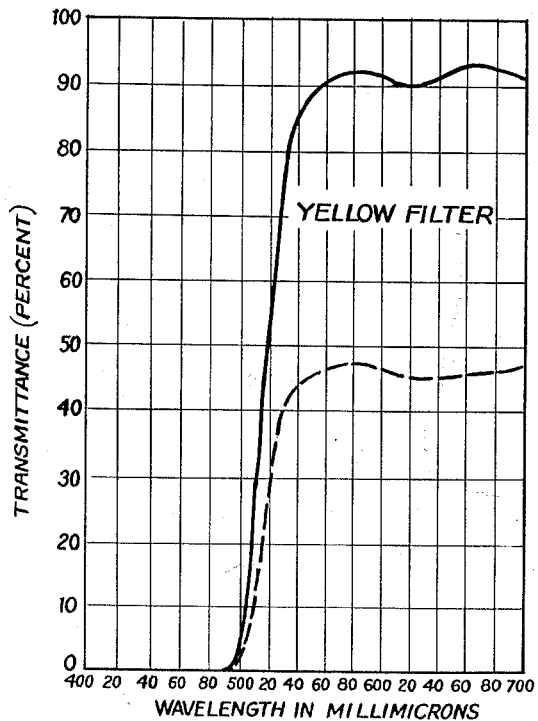

United States Patent Office 3,184,307
Patented May 18, 1965

3,184,307
METHOD AND APPARATUS FOR MAKING COLOR PRINTS
Edward K. Letzer, Rochester, N.Y., assignor to Eastman Kodak Company, Rochester, N.Y., a corporation of New Jersey
Filed Aug. 14, 1959, Ser. No. 833,763
8 Claims. (Cl. 96—23)

The present invention relates to color printing, and particularly to a new method and apparatus for obtaining lowered color correction while obtaining near unity density correction level in making color prints from color negatives.

There are many sources of variation in the printing characteristics of color negatives or transparencies. Some of this variability is within the control of the photographer. The rest is introduced by conditions of manufacture, storage and processing which occur before and after he obtains and exposes the film stock. Regardless of the source of variability, a printing system that handles color materials should eliminate or minimize the resultant effects on the quality of color prints which it produces. In order to produce color prints of salable quality, then, a color printer must provide compensation for color and density variations between individual negatives or scenes. This requires some means of varying both the level of printing exposure and its spectral quality.

In photographic color negatives, the color balance, or the ratio of red, green and blue integrated transmittances, is determined by several factors. The most important of these can be enumerated as:

(1) Illuminant quality (color temperature).
(2) Improper or prolonged storage of the film.
(3) Manufacturing and processing variation of the film.
(4) Over and under exposure when the red, green and blue-sensitive layers of the film do not have matched contrast.
(5) The color balance of the integrated reflectance of the subject area (color subject failure).

R. M. Evans in U.S. Patent 2,571,697, October 16, 1951, teaches that it is possible to determine the color and level of exposure simultaneously by merely measuring the red, green and blue integrated transmittance of an entire negative. Thus the red exposure is a function of the red transmittance characteristics of the negative, the green exposure depends only upon the total green transmittance and so on for the blue. This system is based on the assumption that the negative records of most scenes will integrate to gray or some hue near gray. The integrated transmittance measure is biased toward the minimum density region of the record and the magnitude of this bias depends upon the nature of the negative and the scene recorded on it. The effect of factors 1–4 enumerated above are assumed to be relatively unmodulated by the important subject matter which is generally more highly evidenced in the higher density portions of the negative. Obviously, this is not always the case. However, it has been found to be true in a large number of instances. The assumption states, then, that integrated transmittance should be most sensitive to negative variations caused by anomalous exposure and storage conditions. Therefore, normalization of integrated transmittance should essentially eliminate the major effects of these anomalous conditions.

Therefore, if the total integrated transmittance of any one color varies from normal or standard, an increase or decrease in the additive exposure for that color should be produced. In this way both the color and density variations from standard can be normalized during the printing operation.

A printer operating in accordance with the teachings of Evans, and in which the density variations within the population of negatives to be printed are fully compensated (given nearly full correction), will produce a high yield of acceptable prints from negatives affected by factors 1 to 4 enumerated above. The prints made from "color subject failure" (factor 5) negatives will, however, be of improper color balance since these prints will tend to have a neutral reflectance and will, therefore, not represent accurately the over-all color bias of the original scene. By "color subject failure" is meant scenes which differ appreciably from average by reason of the fact that there is a predominance of one color in the scene, i.e., a scene including a girl in a red dress in front of a red barn; a beach scene having a predominance of blue sky, etc.

It has been proven that the best results for correcting color balance in printing color negatives involving factor 5 above, or color subject failure, is to modify the color correction by lowering it rather than giving full color correction as is done when integrating to gray or a hue near gray, see April 1956 Journal of the SMPTE, vol. 65, pp. 205–215. Automatic color printers which operate at near unity density correction level provide prints of approximately equal total area reflectance from negatives which vary over a considerable density range. Such printers inherently operate at relatively high levels of color correction because of high density correction in each of the red, green and blue printing systems tending to produce prints of constant color balance from negatives of varying color balance. While it is theoretically possible, and attempts have been made to allow, for an operator to individually judge each negative to be printed and by pressing certain color classification buttons modifying the printer control to correct for such subject failure negatives, from a practical standpoint this procedure is impractical. It not only slows down the production of the printer by making it semiautomatic rather than automatic, but attempts to prevent color subject failure by means of "color classification" are not too successful with color negatives. This is especially true of color negatives containing color masks produced from dye couplers in the film emulsion. Relatively minor variations in the over-all color of the image are not easily detected by the eye in the presence of these masks.

The primary object of the present invention is to provide a method of making color prints from color negatives by means of which a lowered color correction can be obtained to improve prints made from negatives having a predominant color, or color subject failure, while at the same time allowing nearly full correction for density variations of the negatives.

Another object is to provide a method of making color prints from color negatives as set forth above in which the negative is illuminated by a source containing red, green and blue light and in which the exposure of each color is terminated by selectively inserting into the printing beam subtractive primary filters in response to the output of monitors integrating the different colors passing through the negative, and in which the desired lowered color correction is obtained by means of the nonmajor absorbancy and/or incomplete major absorbancy of the different subtractive filters.

And still another object is to provide a new method of color printing as set forth above wherein different degrees of lowered color correction can be obtained by adjusting the relative values of the major and non-major absorbancies of the subtractive primary filters.

And a further object is to provide a method of making color prints from color negatives of the type decribed wherein improved results are obtained by lowering the color correction for the green exposure more than the color corrections for the red and blue exposures are lowered.

And still another object is to provide a color printing system or apparatus for carrying out the above-mentioned improved method, and which consists merely in placing the integrating receptors or monitors for the different colors passing through the negative in the printing system ahead of the subtractive primary filters instead of beyond them where they are normally placed in order to correct for the non-major absorbancy of the subtractive filters.

The novel features and I consider characteristic of my invention are set forth with particularity in the appended claims. The invention itself, however, both as to its organization and its methods of operation, together with additional objects and advantages thereof shall best be understood from the following description of specific embodiments when read in connection with the accompanying drawings, in which:

FIGS. 3–5 are spectral transmission curves of subtractive filters used in the printer of FIG. 2 to obtain different degrees of lowered color correction in accordance with the present invention.

Since the present invention is based on the method of color printing carried out by the commercially available time modulated subtractive color printer, an understanding of the operation of such a printer must be had to understand the present invention. In the time modulated subtractive printer, schematically shown in FIG. 1, three independent monitor systems control the respective red, green and blue constant intensity exposures. The exposure is started with white light (i.e., containing red, green and blue radiation) and, as the exposure of each color is completed, a subtractive filter of complementary hue is inserted into the printing beam to terminate the exposure in that color. The printer design is such that the monitors are beyond the subtractive filters so that monitors will compensate for the non-major absorbancies of the subtractive filters (i.e., the blue and green absorbancies of the cyan filter, the blue and red absorbancies of the magneta filter, and the green and red absorbancies of the yellow filter) by lengthening the residual exposure times to compensate for these non-major absorbancies of the filters. Such an arrangement of the monitors relative to the subtractive filters is necessary inasmuch as there is no such thing from a practical standpoint as perfect sharp cutting color filters, or filters which will absorb only one wave length of light and fully transmit all other wave lengths of light. If a printer with this arrangement of parts is adjusted to provide the desired high density level correction necessary to correct for factors 1–4 noted above, it will necessarily have a high color correction level and will not properly print color negative having a predominant hue, "color subject failure negatives."

Figure 1:
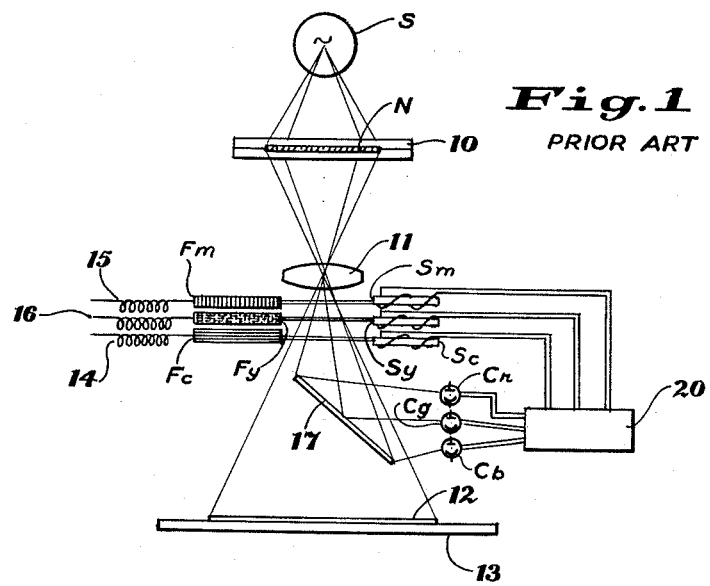
FIG. 1 is a schematic of a prior art white light subtractive printer.

Referring now more specifically to the prior art time modulated subtractive printer shown in FIG. 1, it comprises a white light source S containing red, green and blue components which illuminate a color negative N positioned in a negative stage 10. An image of the illuminated negative is projected by a lens 11 onto a sheet of color print material 12 positioned on an easel 13 in the printing plane of the lens. Positioned below the lens 11, or in the lamp house if desired, are three subtractive primary filters $F_c$, $F_m$ and $F_y$ (cyan, magneta and yellow) which are normally moved out of the printing beam, as by springs 14, 15 and 16, respectively, and which are adapted to be selectively pulled into the beam upon energization of solenoids $S_c$, $S_m$ and $S_y$. Located below the subtractive filters is a beam splitter 17 which directs a part of the light passing through the negative onto three monitoring photocells $C_r$, $C_g$ and $C_b$, which are selectively responsive to red, green and blue light, respectively, in the printing beam. Each of the monitors is connected to a condenser which, under the influence of the photoelectric current from the cell, alters its state of charge and, after reaching a predetermined voltage value, brings about, through a switch arrangement (usually a thyratron tube which is fired) energization of its corresponding solenoid $S_c$, $S_m$ and $S_y$ which causes insertion of one of the subtractive filters into the printing beam to cut off the color which that cell is measuring. Inasmuch as the electronic timer involving the use of a condenser and thyratron switching circuit is well known in the art, and per se forms no part of the present invention, it is shown merely as a box 20. It will thus be understood that at the beginning of the exposure when all the filters are out of the printing beam the printing material is being simultaneously exposed to red, green and blue light. Just as soon as a predetermined, preferably regulatable amount of printing light of one basic color strikes its corresponding photocell, and consequently the voltage of the related condenser in the timer has reached a predetermined value, the proper solenoid will be energized and pull in the respective subtractive filter to stop the exposure for that basic color. For example, when the predetermined amount of red light strikes the red sensitive photocell, solenoid $S_c$ is energized and pulls in the cyan filter $F_c$ to stop the red exposure. Similarly, the blue exposure is stopped when the yellow filter $F_y$ is pulled into the printing beam and the green exposure when the magneta filter $F_m$ is pulled in. When all three filters are moved into the printing beam, the exposure is stopped since theoretically all light is cut off from the printing plane by the filters, but to be absolutely sure, the printing lamp S is de-energized at this time.

It is a well-known fact that from a practical standpoint there is no such thing as a perfectly cutting color filter. In other words, while a cyan filter will absorb all the red light it will also absorb some green and blue light and will have what might be called non-major or green and blue absorbancy factors. The same is true of the magneta filter whose major absorbancy is for green but which it will have minor or non-major absorbancies for red and blue; and the yellow filter whose major absorbancy is for blue but which will have non-major absorbancies for red and green. In the known white light subtractive printer these non-major, or unwanted, absorbancies of each of the filters will be compensated for by reason of the monitors being disposed beyond the filters and thus lengthening the residual exposure times to compensate for these non-major absorbancies.

The present invention concerns making use of, and controlling, the non-major absorbancies of the filters in a time modulated color subtractive filter in order to provide optimum lowered color correction level while maintaining a nearly full correction for density variation of a population of negatives to be printed. This combination of corrections will produce a high yield of acceptable prints affected by "color subject failure," factor 5 mentioned above, as well as those affected by illuminant quality, improper or prolonged storage of the film, and over and under exposure (factors 1–4 mentioned above).

Figure 2:
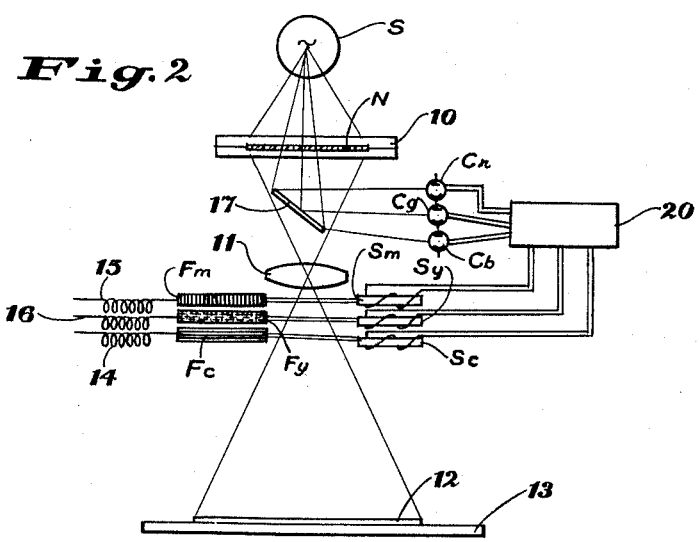
FIG. 2 is a schematic of a white light subtractive printer modified in accordance with the present invention.

In accordance with the present invention this result is readily and simply accomplished by merely rearranging the relative location of the monitoring photocells and subtractive filters in the subtractive color printer shown in FIG. 1 to that shown in FIG. 2. Looking at FIG. 2, showing a printer constructed according to the present invention, it will be seen that the only difference between this printer and the prior art printer shown in FIG. 1 is that the monitoring system has been placed ahead of the subtractive filters so that they will not compensate for the non-major absorbancies of the subtractive filters. Accordingly, since this modified printer has exactly the same components and operates in exactly the same manner as the printer shown in FIG. 1, the parts thereof are designated by the same reference numerals and there appears to be no need for a repeat of the description of the sequence of operation.

If such a modified printer is operated at nearly full correction for density variation of the negative (near unity density coefficient) the color correction level (coefficients) can be varied independently from full to zero by changing the non-major absorbancies of the subtractive filters. The higher the non-major absorbancies of the subtractive filters the lower the color correction level. Independent control of the red, green and blue color coefficients is provided by this system since the non-major absorbancies of the cyan, magenta and yellow printing filters are independently variable. The essential difference in operation of this modified printer comes about by reason of the fact that the non-major absorbancies of the subtractive filter are not compensated for by the monitor cells $C_r$, $C_g$ and $C_b$. Consequently, any reduction in one of the basic colors caused by the non-major, or unwanted, absorbance of any subtractive filter not primary to that color will not be compensated for by the monitoring system for that color and the color correction for that color will be lowered by the non-major transmittance factor of the subtractive filter for the color.

As to how this method of lowered color correction works to improve the yield from amateur negatives will probably best be understood from a description of how this printer is initially set up and operated. For setting up this or any color printer a set of slope negatives is used which are a one-stop exposure series of seven negatives and all seven negatives have the same, or nominally the same, color balance. In other words, the differences between these negatives are in exposure only and, therefore, in overall density level. When the printer has been adjusted to give equal print densities from these slope negatives, the printer is fully compensating for exposure variations as represented by the slope negatives and factors 1-4 above-mentioned are corrected for. This condition in all types of printers is called "full density correction."

When a tri-color printer, other than one modified in accordance with the present invention, has been adjusted to give full density correction, this usually means that that printer is fully compensating not only for overall density variations between negatives, but is also fully compensating for variations in red density level, for variations in green density level, and for variations in blue density level. In other words, the printer is also operating at "full color correction." This means that the printer is producing prints of equal color balance (integrating to gray or a hue near gray) regardless of the color balance of the negatives. Accordingly, the printer is not capable of accurately printing "color subject failure" negatives or those having a wanted predominant hue. Therefore, as pointed out above, experience has shown that full correction printers tend to produce low levels of waste due to exposure error, but high levels of waste due to incorrect color.

In order to understand why this is so, one must consider how a negative comes to have abnormal color balance. One of the major causes of this is the color of the overall scene of which the negative was made. If one takes a picture of a white house against a blue sky, the negative produced by taking the picture from a distant view point will not have the same color balance as another negative taken closer to the same house with less blue sky. When these two negatives are printed in a full correction printer, the abnormally high blue density of the first negative (from the area representing the blue sky) will cause the blue printing time to be relatively longer than the blue printing time of the second negative. Thus the first negative will produce a print with a much yellower house than the white house on the print made from the second negative.

When a color printer has been adjusted to a low correction level, as it may be by selectively varying the spectral sensitivities of the three monitoring systems for the different colors by broadening the filters used over the photoreceptors, the color of the white house in the two prints will match better between the two negatives because the blue excess density in the first negative will be only partially compensated for in the extension of the blue printing time. However, when the monitoring system is adjusted to obtain lowered color correction, the density level correction is also lowered and the slope negatives will produce dark prints from the thin negatives and light prints from the dense negatives.

It follows then that the optimum correction level for density variations would be full correction, while the optimum level for color balance variations would be lowered correction. In order to build both of these optimum levels into a color printer, one must first make the printer capable of differentiating between the two types of abnormalities and then provide a method of handling these abnormalities differently.

This desired result can be accomplished with a variable time subtractive printer modified in accordance with the present invention, as shown in FIG. 2. In setting up this printer the parameters of the monitoring systems are adjusted by the use of a set of slope negatives to provide full density correction, or stating it another way, the prints made from these slope negatives will match in density. However, since the monitoring photocells $C_r$, $C_g$ and $C_b$ are placed in the printing system ahead of the subtractive filters and, therefore, do not compensate for the non-major absorbancies of the filters, the printer operates at a lowered color correction level. The ratio of the printing times in the printer should be initially adjusted so that negatives of normal color balance print in nearly equal red, green and blue printing times. Since the seven slope negatives have normally the same color balances, the ratio between the red, green and blue printing times is nearly equal for all seven and the color balance as well as the density of the seven prints made from these negatives is also equal. It follows, therefore, that lowered color correction does not affect prints made from negatives of normal color balance regardless of the density level of such negatives.

Let us now consider negatives of abnormal color balance. Going back to the two negatives of the white house, the second negative (without much blue sky) could be expected to have near-normal color balance and, therefore, will produce a good print. The first negative, however, has a relatively high blue density and will receive a longer blue exposure in a printer constructed in accordance with the present invention since it is a full density correction printer. However, the magenta filter comes into the beam at the end of the green exposure (which is of normal duration) and the cyan filter comes into the beam at the end of the red exposure (which is also of normal duration) and the blue intensity striking the print material is reduced by the blue absorption (non-major absorbance) of these two filters for the remaining duration of the blue printing time. This causes less yellow dye to be formed in the print and the house remains whiter than it would have been had the magenta and cyan filters been perfect cutting filters and had no non-major absorption for blue light or had this non-major blue absorption of these two filters been fully compensated for. Had the monitoring photocells $C_r$, $C_g$, $C_b$ been placed between the subtractive filters and the color print material, as in known color printers of this type, the blue intensity to the blue monitor $C_b$ (as well as to the print material) would have been lowered during the residual blue exposure and this residual exposure time would have been lengthened accordingly so that the house would appear more yellow on the print.

By selective design of the subtractive primary filters the desired non-major absorbancies of the filters can be varied to obtain the desired lowering of the color correction level. Tests have been made to determine a usable range of lowered color correction and it is felt that the minimum amount of lowering which will produce significantly improved yield of customer prints should be at least 20% lower color than density correction level. Thus if the printer is set for full density correction, this would mean that the color correction level should not be above 80% of full correction. It is further believed that the lowest usable level of color correction for customers' negatives might be about 40%.

In FIGS. 3-5 there is shown in full lines the spectral transmission curves of the subtractive filters used in a printer constructed in accordance with the present invention and found to give very desirable yield of acceptable prints when used to print a run of customers' negatives. These particular filters gave the following color correction levels: red 72%, green 58% and blue 75%.

I have found, and it will be noted from the given example, that the amount of color correction lowering in all of the colors is not necessarily equal for the best results, but should be more pronounced (lower) in the green and magenta than in the other colors. The reason for lowering the green color correction more than the red and blue is because the variations in color balance caused by illuminant quality (factor 1 above) do not affect the green-magenta axis of the CIE chromaticity triangle and corrections for factor 1 is desired (higher levels of red and blue correction), along with the fact that the eye is more sensitive to color shifts along the green-magenta axis of the CIE triangle, within the print gamut, than to color shifts along the color temperature axis. This fact is borne out by the well-known McAdam ellipses showing standard deviations of chromaticity from indicated standards, see JOSA, vol. 32, May 1942, pp. 247-274. It necessarily follows that the appearance of green and magenta in neutral tones (gray and white) of a color print are easily detected and are very objectionable to most people. An overcorrection in the green is tolerable since repeated examination of different populations of customers' negatives has shown that the major shift in color balance of the negatives will be due to variations in illumination when exposing the negative and will thus appear along the color temperature axis of the CIE chromaticity triangle, whereas the spread along the green-magenta axis, which is perpendicular to the color temperature axis, will be relatively narrow for this same population of negatives.

In accordance with the present invention this reduction of the color correction by an optimum amount in each color individually can be readily accomplished by especially designing the subtractive printing filters to have the desired major and nonmajor absorbancy factors. Looking at the filter curves in FIGS. 3-5, it will be seen that the magenta filter (FIG. 3) has more unwanted green transmittance and higher blue absorbance than the cyan and yellow filters, which explains the lower color correction (58%) in the green than in the red and blue given in the example. The unwanted green transmittance of the magenta filter (FIG. 3) is not an intentional result, but arose by reason of the fact that in order to optimumly adjust (decrease) the non-major absorbancies of the magenta filter, it was necessary to reduce the concentration of this filter and, hence, its major absorbance to a slight extent.

After the initial test of the printer was run with the above-noted filters, a Wratten 96 filter was added to each of the printer filters. This had the effect of increasing the non-major absorbance of the printing filters as well as increasing the major absorbance of these filters. However, since the major absorbance is relatively great, there is little effect on them by the addition of the neutral density. Three additional determinations of color correction level were made with .10, .20 and .30 density values of the Wratten 96 attenuator respectively added to the subtractive filters. The color correction levels indicated by the prints made in these tests were as follows:

| Wratten 96 level | 0 | .10 | .20 | .30 |
|---|---|---|---|---|
| Color correction level: | | | | |
| Red | .72 | .61 | .51 | .44 |
| Green | .58 | .47 | .46 | .41 |
| Blue | .75 | .59 | .55 | .44 |

The spectral transmittance of the subtractive printing filters with .30 density Wratten 96 added are shown in FIGS. 3-5 in broken lines to distinguish from the curves of those filters without the added neutral density. The results obtained with the .30 neutral density added to the printing filter indicate the lowest practicable level of color correction (40%) in color balance which can be used with internegatives made from color transparencies for printing on a commercially available color print material sold under the trade name of Ektacolor paper.

While I have shown and described specific embodiments of my new method and apparatus for printing color negatives, it is obvious that certain modifications of the same are possible. For example, instead of using a white printing light which contains light of the three primary colors, separate red, green and blue sources could be used as the printing source. Furthermore, the monitoring cells could be situated to look at the negative transmitted light directly rather than being located at the side of the beam and requiring a beam splitter. Accordingly, my invention is not to be limited to the specific details of construction shown and described but is intended to cover all modifications coming within the scope of the appended claims.

Having thus disclosed by invention, what I claim is new and novel and desire to secure by Letters Patent of the United States is:

1. The method of making a color print from a color negative on a color print material which comprises the steps of illuminating said negative with a light source including the three primary colors, red, blue and green; projecting an image of said illuminated negative onto said color print material; individually and exclusively measuring the total integrated red, green and blue transmittances of said negative; terminating the red, green and blue exposures of said print material by individually inserting subtractive primary filters into the negative transmitted light beam ahead of said print material at intervals determined in accordance with the difference between said individually and exclusively measured integrated transmittances of said negative and corresponding integrated transmittances which in combination would print the negative substantially at a full density correction level; characterized in that said subtractive filters are inserted into the printing system beyond the point at which the measurements of the red, green and blue negative transmitttances are made in order to obain lowered color correction while maintaining substantially full density correction in the exposure by virtue of the fact that the non-major absorbencies of the filters are ignored in the determination of the time of exposure for each of the primary colors, whereas the non-major absorbencies of the filters act to reduce the intensity of the individual color exposures in accordance with the order in which said filters are moved into the negative transmitted light beam.

2. A method of making a color print from a color negative according to claim 1 characterized in that the non-major absorbancies of the subtractive filters are adjusted in order to obtain a lowered color correction level which is between 80% and 40% full color correction when the negative is printed at full density correction level.

3. A method of making a color print from a color negative according to claim 2 characterized in that the color correction in each of said primary colors is lowered individually and the green is lowered more than the color correction in the blue and red.

4. A method of making a color print from a color negative according to claim 2 in which the non-major absorbancies of the subtractive filters are adjusted to give the following color correction levels, red 72%, green 58% and blue 75%.

5. A color printer comprising in combination a negative stage for positioning a color negative to be printed; means for illuminating a color negative positioned on said stage with light containing the three primary colors; optical means including a projection lens for receiving a printing beam from said illuminated negative and for focusing said beam to form an image of said negative at a printing plane where an area of a color printing material is adapted to be located; three subtractive primary filters movable individually between an inoperative position, wherein they are out of said printing beam, and an operative position, wherein they are moved into said printing beam to cut off their corresponding primary colors from said printing beam before it strikes said printing plane; monitoring means for measuring the integrated intensity of each of the primary colors passing through said negative and causing each of said subtractive filters to move to their operative positions when a predetermined amount of each of the primary colors corresponding thereto has passed through said negative, said monitoring means including photoreceptors selectively sensitive to different ones of each of the primary colors and having a spectral response for the color to which it is sensitive which closely matches the optical response of said color print material for that color, and characterized in that said photoreceptors are optically disposed relative to said printing beam to receive light from the beam ahead of the point in said beam at which said subtractive primary filters are introduced so as to measure the intensity of the primary colors in said printing beam before such intensities are reduced by the introduction of one or more of said filters into said printing beam.

6. A color printer according to claim 5 characterized in that the subtractive primary filters have non-major absorbancies which will provide a lowered color correction which is between 80% and 40% of full color correction when the printer is operated at full density correction.

7. A color printer according to claim 6 characterized in that the subtractive primary filters have non-major absorbancies which will provide a lower color correction in the green than in the blue and red.

8. A color printer according to claim 5 characterized in that the subtractive primary filters are not opaque to light of complementary color and which will provide a lower color correction in the green than in the blue or red.

References Cited by the Examiner

UNITED STATES PATENTS

| 2,529,975 | 11/50 | Smith | 96—23 |
| 2,566,264 | 8/51 | Tuttle | 96—23 |
| 2,571,697 | 10/51 | Evans | 96—23 |
| 2,764,060 | 9/56 | Horak | 96—23 |
| 3,100,419 | 8/63 | Clapp | 88—24 |

FOREIGN PATENTS

| 409,287 | 4/34 | Great Britain. |
| 21,328 | 8/56 | Germany. |

OTHER REFERENCES

The Photo Finisher, vol. 31, No. 2, page 8, 1959.

Photographic Trade News, vol. 26, No. 37, page 21, Step 3, 1962.

Pieronek et al., "Printing the Color Negative," PSA Technical Quarterly, November 1956, pages 145–156 (page 153 especially relied upon). Copy in 96–23.

NORMAN G. TORCHIN, *Primary Examiner.*

H. N. BURSTEIN, *Examiner.*